No. 694,072. Patented Feb. 25, 1902.
W. M. PEARCE.
PIPE COUPLING.
(Application filed Nov. 7, 1901.)
(No Model.)

Witnesses
Elmer Seavey
T. L. Glorius

Inventor,
W. M. Pearce
By Davis & Davis
Attorneys

UNITED STATES PATENT OFFICE.

WILLIAM MILBURN PEARCE, OF NORWOOD, WEST VIRGINIA.

PIPE-COUPLING.

SPECIFICATION forming part of Letters Patent No. 694,072, dated February 25, 1902.

Application filed November 7, 1901. Serial No. 81,417. (No model.)

*To all whom it may concern:*

Be it known that I, WILLIAM MILBURN PEARCE, a citizen of the United States of America, residing at Norwood, in the county of McDowell and State of West Virginia, have invented certain new and useful Improvements in Pipe-Couplings, of which the following is a specification, reference being had to the accompanying drawings, in which—

Figure 1:
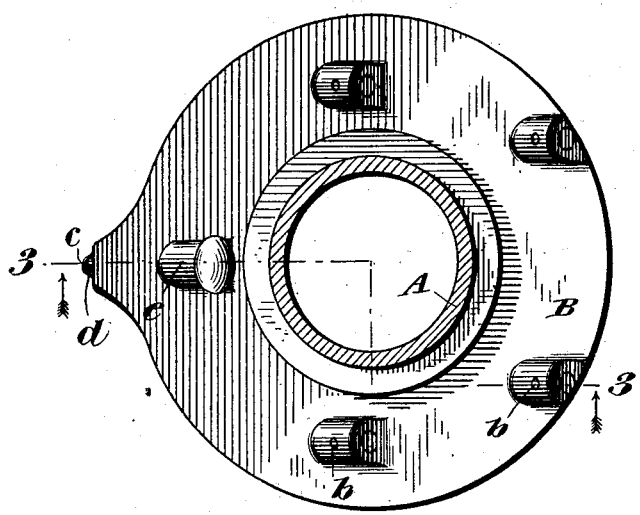
Figure 2:
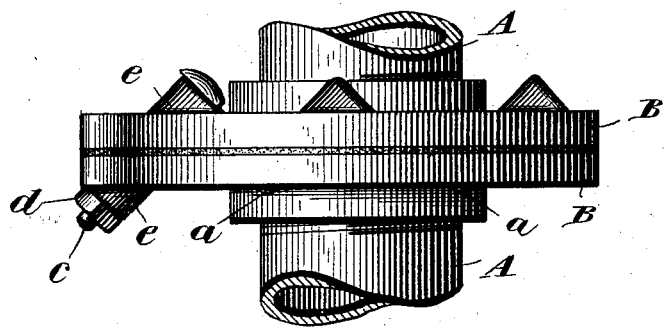
Figure 3:
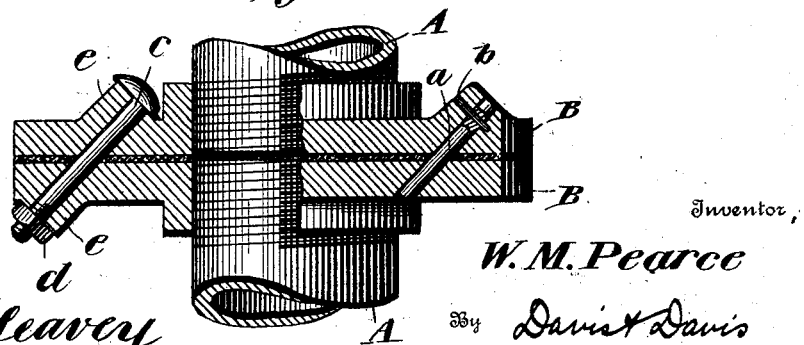

Figure 1 is a plan view of the coupling, the pipe being in section; Fig. 2, a side elevation thereof, and Fig. 3 a vertical section on the line 3 3 of Fig. 1.

The object of this invention is to provide a simple and inexpensive and practical coupling device for metallic piping; and it consists of certain novel features hereinafter set forth and claimed.

Referring to the drawings by reference-letters, A designates the ends of the pipe to be coupled, which are screwed into circular flanges B in the usual manner. One of the flanges is provided with a series of pins $a$, which extend beyond the bearing-face of the flange and are set obliquely thereto, all said pins being inclined at the same angle and in the same direction and entering similarly-inclined holes or recesses in the opposite flange. These pins may be secured rigidly in place in any suitable manner, but preferably in the manner shown, which consists in casting an angular enlargement on the outer face of the flange and drilling a hole down through the same and into the pin for the reception of a lock-pin $b$. The flanges are drawn together by a bolt $c$, which passes through both flanges and is provided with a nut $d$ at one end. This bolt is set at an angle corresponding to the pins $a$ and is inclined in the same direction, and to afford square bearings for the head of the bolt and the nut angular enlargements $e$ are formed on the outer faces of the respective flanges.

To connect up the coupling, it is simply necessary to insert the ends of the bolt and the pins into their respective openings or sockets and then draw the bolt, and to disconnect the coupling it is simply necessary to remove nut $d$. The pins $a$ and the bolt are put in place before the flange is screwed to the pipe, after which they are not removed except for renewal or repair. It will be observed that the bolt is in reality but one of the pins extended and threaded for the reception of the nut. Any number of pins may be employed; but I prefer to employ four pins and one bolt on couplings of the ordinary size and to dispose them around the flange at equal distances apart.

My coupling will cost no more to manufacture than the couplings of the ordinary make and will save a large proportion of the time usually consumed in coupling up and uncoupling the ordinary flange-and-bolt coupling, as in such couplings there are from four to six bolts to manipulate, whereas in mine there is but one bolt. Furthermore, the bolt may be readily positioned so that it may be conveniently gotten at with a wrench, while with the ordinary coupling in use the line of piping must be moved away from the supporting-wall before access can be had conveniently to the nuts.

This device is especially advantageous for use in connection with pipework in mines and shafts where water accumulates rapidly and the pumps cannot be stopped for any length of time without considerable loss. It will be observed also that where the piping is set so that the strain is in the direction of the bolt and pins the tendency will be to hold the parts of the coupling together. This is quite an important item, especially where the piping is used on slopes and in shafts where it has to be disconnected frequently for the purpose of blasting.

Having thus fully described my invention, what I claim, and desire to obtain by Letters Patent, is—

1. In a coupling, the combination of the pipes provided with flanges, one of said flanges being provided with one or more pins extending obliquely from one of its faces and entering similarly-inclined holes in the other flange, and means for drawing the two flanges together.

2. In combination, two pipe-sections each of which is provided with a flange, one flange carrying one or more pins and a bolt extending obliquely from its bearing-face and entering similarly-inclined holes in the other flange, the bolt and pins being set at the same angle and inclining in the same direction, and a nut on said bolt.

In testimony whereof I hereunto affix my signature, in the presence of two witnesses, this 31st day of October, 1901.

WILLIAM MILBURN PEARCE.

Witnesses:
B. F. WILLIAMS,
G. P. BEAVERS.